United States Patent Office
2,892,852
Patented June 30, 1959

2,892,852

(ALKYLTHIO)-, (ACETYLTHIO)- AND (ARYLTHIO)- UNDECANOIC ACIDS

Nathan H. Koenig, Elkins Park, and Daniel Swern, Philadelphia, Pa., assignors to the United States of America as represented by the Secretary of Agriculture No Drawing. Application May 28, 1957
Serial No. 662,299

1 Claim. (Cl. 260—400)

(Granted under Title 35, U.S. Code (1952), sec. 266)

A non-exclusive, irrevocable, royalty-free license in the invention herein described, throughout the world for all purposes of the United States Government with power to grant sublicenses for such purposes, is hereby granted to the Government of the United States of America.

The present application is a continuation-in-part of the copending application by Nathan H. Koenig and Daniel Swern entitled "Long-Chain Sulfides," Serial No. 637,334, filed January 30, 1957.

This invention relates to sulfur containing derivatives of 10-undecenoic acid, particularly the organic sulfides formed by the addition of thiols to 10-undecenoic acid. The compounds of the present invention may be represented by the general formula $$RS(CH_2)_{10}COOH$$

where R is a radical selected from the group consisting of n-propyl, n-butyl, n-hexyl, n-heptyl, n-octyl, n-undecyl, n-dodecyl, 2-hydroxyethyl, acetyl, benzyl, phenyl, and 2-naphthyl.

Novel sulfides are prepared by addition reactions between thiols (RSH) and the monosaturated fatty acid, 10-undecenoic acid, as illustrated by the following equation:

$$RSH + CH_2=CH(CH_2)_8COOH \rightarrow RS(CH_2)_{10}COOH$$
(Equation 1)

It should be noted that when R is acetyl, the reaction is

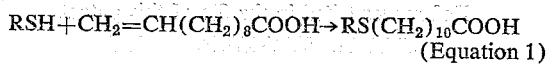
(Equation 2)

The sulfur compound which is being added, thiolacetic acid, is a thiolacid rather than a simple thiol, and the product is a thiolester rather than a simple sulfide. This product may be called 11-(acetylthio)-undecanoic acid or 10-carboxydecyl thiolacetate depending on whether one choses to name the molecule as a substituted undecanoic acid or as an ester of thiolacetic acid.

The presence of the carbonyl (CO) group adjacent to the sulfur atom confers special chemical properties on the molecule; consequently Equation 2 is a special case of the general reaction described by Equation 1.

In the aforementioned copending application, we discussed utilization of organic sulfides and illustrated the use of derivatives of (carboxymethylthio)-undecanoic acid as low-temperature plasticizers. In addition to their possible use in the preparation of greases, lubricant additives, emulsifiers, soaps and other surface-active agents, the new compounds of the present invention serve as chemical intermediates for the preparation of sulfoxides, sulfones, amides, amines, esters, and other classes of useful organic compounds.

One of the reactions of 11-(acetylthio)-undecanoic acid, which illustrates how it differs from the (alkylthio)- and (arylthio)-undecanoic acids, is the reaction with peracetic acid (Example 13). Instead of the unexpected 11-(acetylsulfonyl)-undecanoic acid, the isolated product is 11-sulfoundecanoic acid, $$(HO_3S(CH_2)_{10}COOH)$$

This molecule has two polar acid groups separated by a long linear hydrocarbon chain. This structure makes this compound useful as a base for surface-active materials, such as water-soluble soaps, and as an intermediate for linear polymers.

The 10-undecenoic acid (B.P. 136° at 1.5 mm., $n_D^{30}=1.4458$) used in the reactions had been purified by fractional distillation of the best commercial material. Most of the thiols were the best commercial grades. n-Octanethiol (B.P. 77° at 33 mm.) was also fractionated prior to use. Mercaptoethanol, thiolacetic acid and benzenethiol were practical grade reagents. The preparation and properties of certain (alkylthio)- and (arylthio)-undecanoic acids, 11-(acetylthio)-undecanoic acid, and 11-sulfoundecanoic acid, will now be described in greater detail.

EXAMPLE 1

*11-(n-heptylthio)-undecanoic acid.*—10-undecenoic acid (45.6 g., 0.25 mole) and n-heptanethiol (33.3 g., 0.25 mole) were mixed in a quartz flask and irradiated at a distance of 1 inch by a 140 watt ultraviolet lamp (high pressure quartz mercury arc). After three hours of irradiation, during which time the temperature rose to about 80°, the reaction product was crystallized three times at 4° from 600-ml. portions of petroleum ether, yielding 49 g. (62% yield) of 11-(n-heptylthio)-undecanoic acid, M.P. 53–54°.

EXAMPLE 2

*11-(acetylthio)-undecanoic acid.*—10 undeceneoic acid (11.1 g., 0.060 mole) and thiolacetic acid (4.7 g., 0.062 mole) were irradiated at 2 inches from a 140 watt ultraviolet lamp for 1 hour (temperature, 70°). The solid reaction product, after extraction with petroleum ether, left nearly pure 11-(acetylthio)-undecanoic acid, M.P. 56–58°, in 55% yield.

The other compounds listed in Table I as Examples 3 to 12 were prepared in a similar fashion with the following exceptions.

EXAMPLE 9

*11-(2-hydroxyethylthio)-undecanoic acid.*—Equimolar amounts of mercaptoethanol and 10-undecenoic acid were added to a flask and stirred for 1½ hours at 60°. No ultraviolet irradiation was necessary. The product was recrystallized from acetone-petroleum ether, then acetonitrile, and finally carbon tetrachloride to obtain the analytical sample of 11-(2-hydroxyethylthio)-undecanoic acid, M.P. 70°.

EXAMPLE 11

*11-(phenylthio)-undecanoic acid.*—Roughly equimolar amounts of benzenethiol and 10-undecenoic acid, together with a catalytic amount (1%) of lauroyl peroxide, were heated overnight at 60° under an atmosphere of nitrogen. The resulting solid, after removal of petroleum ether solubles, left 11-(phenylthio)-undecanoic acid, M.P. 83°, in 61% yield. Recrystallization from heptane gave the anayltical sample, M.P. 84°.

Analytical data for the recrystallized products are summarized in Table I. Melting points were obtained with a micro hot stage apparatus.

EXAMPLE 13

*11-sulfoundecanoic acid.* — 11-(acetylthio)-undecanoic acid (5.2 g., 0.02 mole) was dissolved in 20 ml. of acetic acid. Peracetic acid (9 ml. of 40% solution in acetic acid, 0.05 mole) was added dropwise over a 15-minute period so that the temperature reached a maximum of 80°. The reaction mixture was evaporated in a desiccator over sodium hydroxide at 25° and 15 mm.

pressure until there was no further weight loss. The crude product, M.P. 59–62°, neut. equiv. 141, corresponded to 11-sulfoundecanoic acid hemihydrate, neut. equiv. 138. An ether-insoluble fraction was separated and discarded; the ether-soluble acid was purified by recrystallization from ether-benzene. Vacuum desiccation at room temperature gave anhydrous 11-sulfoundecanoic acid, M.P. ca. 94°.

Although infrared and X-ray diffraction studies indicate that the addition products have a linear structure, that is, the sulfur atom is attached at the 11 (terminal) rather than the 10 position of the undecanoic acid, trace amounts of the 10 isomer may also be formed. Hence, we do not wish to restrict this invention to 11-substituted undecanoic acid.

When the reaction is to proceed over a considerable period of time as in Example 11, where 1% lauroyl peroxide was employed as a catalyst and the mixture was heated overnight at 60°, it was considered preferable to displace the air atmosphere with nitrogen, as oxygen may promote slow side reactions.

The molar ratio of thiol to fatty acid is not a critical factor in the reaction. Starting with equimolar amounts of the reactants, yields of about 60% were obtained under the reaction conditions described in Example 1. Within limitations, it is considered that the yields would vary directly with the ratio of thiol to fatty acid.

The reaction temperature is not critical, but for ease of controlling the exothermic reaction we prefer to maintain a temperature of about 40–80°.

TABLE 1

*11-(alkylthio)-, (acetylthio)- and (arylthio)-undecanoic acids*

$RS(CH_2)_{10}COOH$

| Example Number | R | Formula | M.P.,[a] °C. | Neut. equiv. | | Carbon, Percent | | Hydrogen, Percent | | Sulfur, Percent | |
|---|---|---|---|---|---|---|---|---|---|---|---|
| | | | | Calcd. | Found | Calcd. | Found | Calcd. | Found | Calcd. | Found |
| 2 | Acetyl | $C_{13}H_{24}O_3S$ | 59 | 260 | 264 | 60.0 | 59.8 | 9.29 | 9.27 | 12.3 | 12.6 |
| 3 | n-Propyl | $C_{14}H_{28}O_2S$ | 44 | 260 | 259 | | | | | | |
| 4 | n-Butyl | $C_{15}H_{30}O_2S$ | 55 | 274 | 275 | 65.6 | 65.3 | 11.0 | 10.8 | 11.7 | 11.9 |
| 5 | n-Hexyl | $C_{17}H_{34}O_2S$ | 53 | 303 | 302 | 67.5 | 67.5 | 11.3 | 11.4 | 10.6 | 10.8 |
| 1 | n-Heptyl | $C_{18}H_{36}O_2S$ | 54 | 317 | 317 | 68.3 | 68.5 | 11.5 | 11.5 | 10.1 | 10.2 |
| 6 | n-Octyl | $C_{19}H_{38}O_2S$ | 60 | 331 | 332 | 69.0 | 69.0 | 11.6 | 11.8 | 9.70 | 9.30 |
| 7 | n-Undecyl | $C_{22}H_{44}O_2S$ | 68 | 373 | 372 | | | | | | |
| 8 | n-Dodecyl | $C_{23}H_{46}O_2S$ | 68 | 387 | 388 | 71.4 | 71.5 | 12.0 | 11.8 | 8.29 | 8.09 |
| 9 | 2-Hydroxyethyl | $C_{13}H_{26}O_3S$ | 70 | 262 | 266 | 59.5 | 59.0 | 10.0 | 10.3 | 12.2 | 12.0 |
| 10 | Benzyl | $C_{18}H_{28}O_2S$ | 54 | 308 | 308 | 70.1 | 69.9 | 9.15 | 9.14 | 10.4 | 10.4 |
| 11 | Phenyl | $C_{17}H_{26}O_2S$ | 84 | 294 | 294 | 69.3 | 69.5 | 8.90 | 9.26 | 10.9 | 11.2 |
| 12 | 2-Naphthyl | $C_{21}H_{28}O_2S$ | 99 | 345 | 344 | 73.2 | 73.1 | 8.19 | 8.12 | 9.31 | 9.24 |

[a] Determined with a micro hot stage.

The reactions proceed moderately rapidly at temperatures below 100° under free-radical conditions, often with the assistance of ultraviolet light. As is common in free-radical reactions, the rate of reaction of thiols (mercaptans) with the double bond of fatty acids is influenced by physical factors and chemical agents which act as catalysts or inhibitors. In reactions where the thiols would add slowly, ultraviolet irradiation was employed in order to obtain better yields in a shorter period of time, but it should not be considered a critical feature of the reaction as its relative importance varies with the thiol being added. Mercaptoethanol, an unusually reactive thiol, added satisfactorily when simply stirred with 10-undecanoic acid at 60°.

We claim:

A process for making 11-sulfoundecanoic acid comprising oxidizing 11-(acetylthio)-undecanoic acid with peracetic acid.

References Cited in the file of this patent

UNITED STATES PATENTS

| 2,216,751 | Rosen | Oct. 8, 1940 |
| 2,354,550 | Rosen | July 25, 1944 |
| 2,454,108 | Walling | Nov. 16, 1948 |
| 2,522,476 | Wasson | Sept. 12, 1950 |

FOREIGN PATENTS

| 905,976 | France | Dec. 19, 1945 |